United States Patent [19]

Woods

[11] Patent Number: 4,967,400

[45] Date of Patent: Oct. 30, 1990

[54] DIGITAL MARINE SEISMIC SYSTEM

[75] Inventor: Theodore E. Woods, Stafford, Tex.

[73] Assignee: Syntron, Inc., Houston, Tex.

[21] Appl. No.: 423,536

[22] Filed: Oct. 16, 1989

Related U.S. Application Data

[63] Continuation of Ser. No. 160,613, Feb. 26, 1988, abandoned, which is a continuation of Ser. No. 869,429, Jun. 2, 1986, abandoned, which is a continuation-in-part of Ser. No. 621,495, Jun. 18, 1984, abandoned.

[51] Int. Cl.⁵ ............................................. G01V 1/22
[52] U.S. Cl. ...................................... 367/21; 367/76; 367/78; 367/79
[58] Field of Search ................ 181/110, 112; 340/850, 340/851; 367/19-21, 76-80, 106, 129, 130, 141, 149, 153, 154

[56] References Cited

U.S. PATENT DOCUMENTS

| | | | |
|---|---|---|---|
| 3,652,979 | 3/1972 | Angelle | 367/79 |
| 3,986,162 | 10/1976 | Cholez et al. | 367/79 |
| 3,988,712 | 10/1976 | Ezell et al. | 367/80 |
| 3,990,036 | 11/1976 | Savit | 367/135 |
| 3,995,227 | 11/1976 | Lefevre | 330/9 |
| 3,996,553 | 12/1976 | Siems et al. | 367/79 |
| 4,072,923 | 2/1978 | Siems et al. | 367/6 |
| 4,092,629 | 5/1978 | Siems et al. | 367/79 |
| 4,112,412 | 9/1978 | Howlett | 367/79 |
| 4,117,448 | 9/1978 | Siems | 367/79 |
| 4,136,326 | 1/1979 | Naudot et al. | 367/39 |
| 4,187,493 | 2/1980 | Patterson | 367/135 |
| 4,218,767 | 8/1980 | Joosten et al. | 367/79 |
| 4,231,111 | 10/1980 | Neeley | 367/19 |
| 4,300,653 | 11/1981 | Cao et al. | 181/107 |
| 4,308,598 | 12/1981 | Mahmood | 367/79 |
| 4,319,347 | 3/1982 | Savit | 367/52 |
| 4,320,472 | 3/1982 | Fort | 367/79 |
| 4,323,990 | 4/1982 | Goode et al. | 367/21 |
| 4,398,271 | 8/1983 | Cretin et al. | 367/20 |
| 4,408,307 | 10/1983 | Harris | 367/79 |
| 4,464,739 | 8/1984 | Moorcroft | 367/130 |
| 4,511,999 | 4/1985 | Bowden et al. | 367/23 |
| 4,611,171 | 9/1986 | Woods | 367/19 |
| 4,671,120 | 6/1987 | Fowler | 367/19 X |

FOREIGN PATENT DOCUMENTS

| | | |
|---|---|---|
| 2036151 | of 1970 | France . |
| 2079654 | of 1971 | France . |
| 2167263 | of 1973 | France . |
| 2185194 | of 1973 | France . |
| 2237552 | of 1975 | France . |

OTHER PUBLICATIONS

Random House College Dictionary, Random House, Inc., 1980, pp. 418.

Giles et al., "A Marine Digital Streamer", pp. 1-7, FIGS. 1-12.

Cain et al., "An Advanced Multiplexed Streamer System", pp. 1-19, FIGS. 1-20.

Brochure by Digicon Inc. concerning its 240 Channel Digital Streamer System, entitled "DSS-240 Micropower Digital Streamer System".

"A Marine Digital Streamer" by F. G. Giles, D. R. Steetle and T. Woods publicly presented prior to the subject invention.

"DSS-240 Digital Streamer System Specifications and Quality Control Cable Test", used by Digicon Inc. in advertising its Marine Digital Streamer.

(List continued on next page.)

Primary Examiner—Brian S. Steinberger
Attorney, Agent, or Firm—Arnold, White & Durkee

[57] ABSTRACT

A digital marine seismic system employs a plurality of data acquisition control modules which simultaneously digitize analog seismic signals. The control modules also are selectably addressable in that each module is uniquely programmed to respond only to a particular control word. The system allows a large number of channels, such as 480 channels, on a simple transmission system, such as a twisted pair of wires. Each module includes a power switch to sequentially apply power to downstream modules. Selective addressing of the switches allow testing of specific modules for power malfunctions.

14 Claims, 9 Drawing Sheets

OTHER PUBLICATIONS

"DSS-240 Digital Streamer System SEGY Field Tape Format", used by Digicon Inc. in advertising its Marine Digital Streamer.

"Marine Seismic Digital Telemetry System", by Lee E. Siems is a paper presented at the Twelfth Annual Offshore Technology Conference in Houston, May 5-8, 1980.

"LRS-16 Kiloseis—The Digital Streamer System for Marine Seismic Exploration": by Western Geophysical is an advertising document which appears to describe subject matter similar to U.S. Pat. No. 4,092,629.

"Tuning Into More Channels": by Ted Wilding-White from The Oilman on Mar. 14, 1981 which compares the Siesmic Streamer System offered by Digicon Inc. and Western Geophysical Inc.

"Receiver System—Seismic Acquistion System" by GECO Geophysical Company, Inc. describing GECO's Seismic Cable System.

"An Advanced Multiplexed Streamer System" by employees of Geophysical Service, Inc. a subsidiary of Texas Instruments, Inc. presented prior the subject invention and describes the 240-Channel Multiplex Streamer built by Geophysical Service, Inc.

"Frequency Response of the DSS-240 Seismic Channel Filters" is a brochure used by Digicon Inc. in advertising its Marine Streamer.

SERCEL SN348 Telemetry System is a Technical Summary dated Apr., 1982.

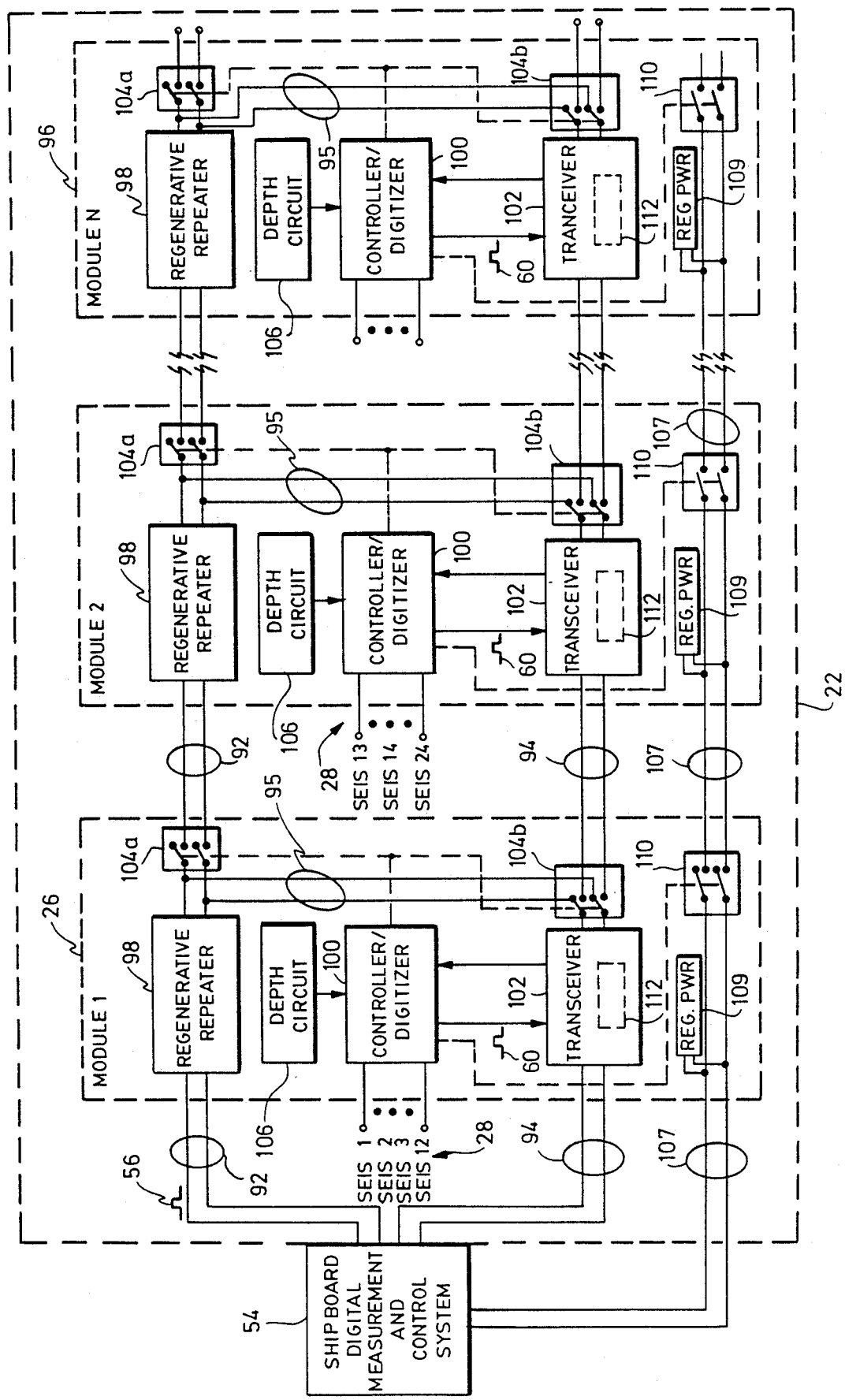

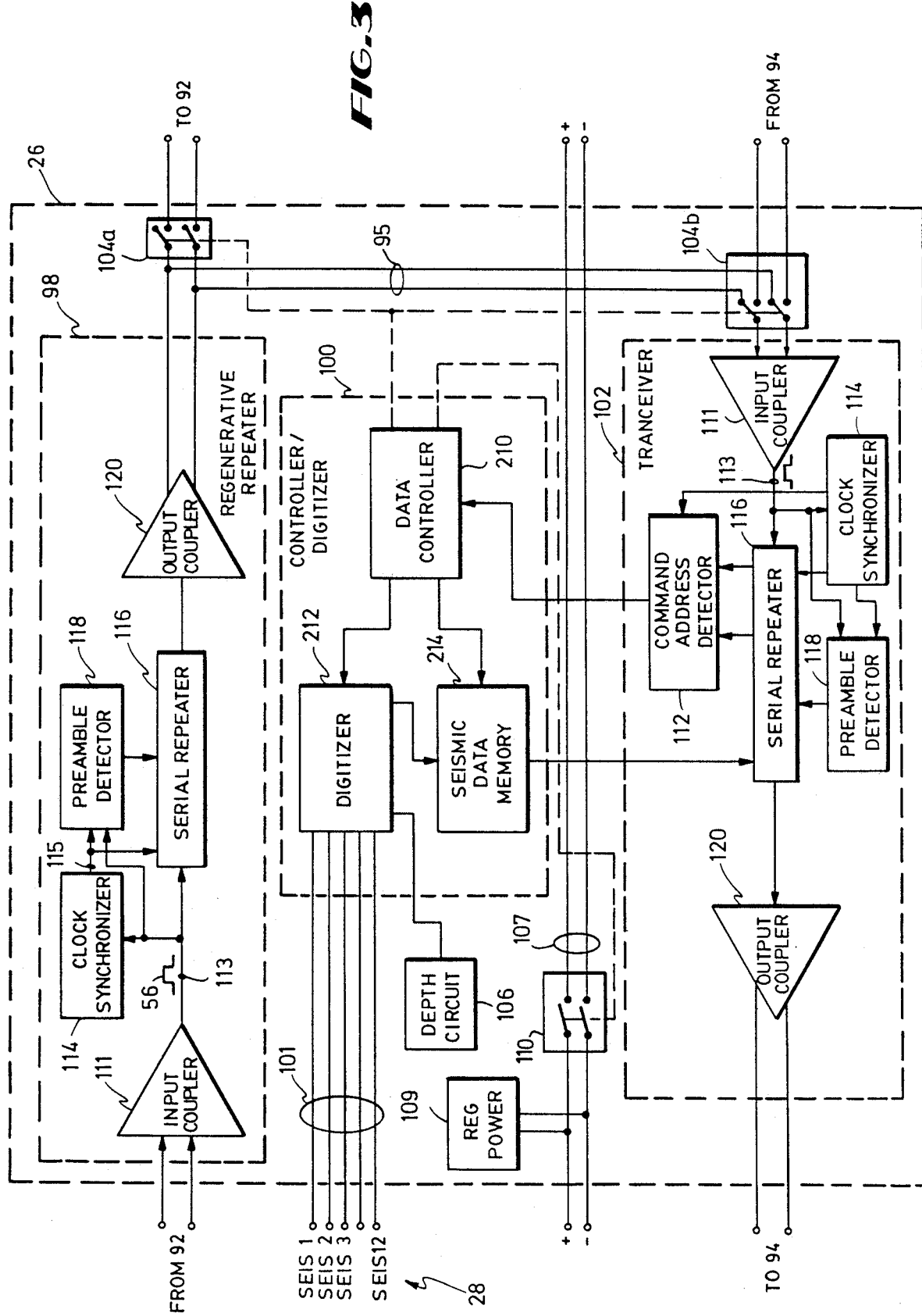

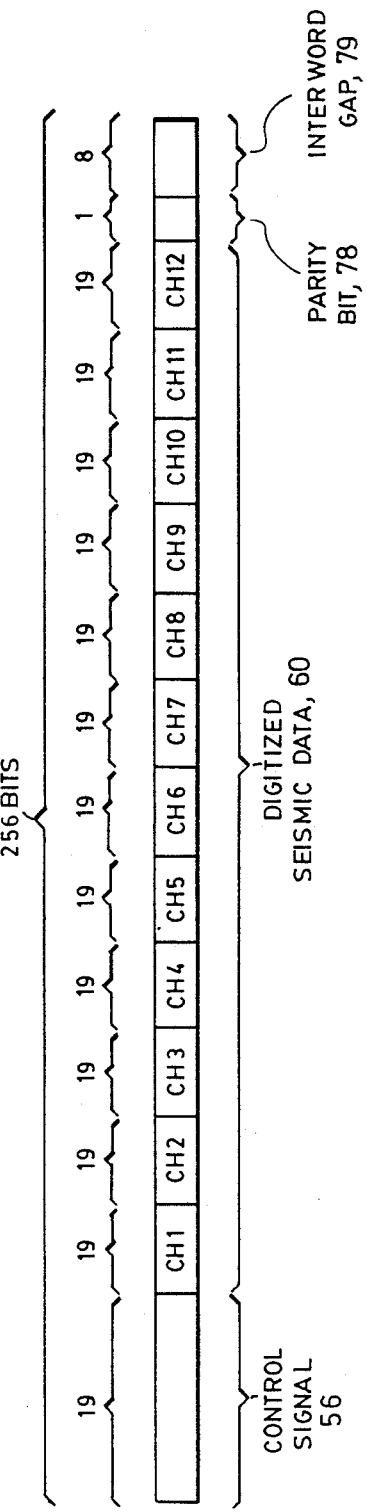
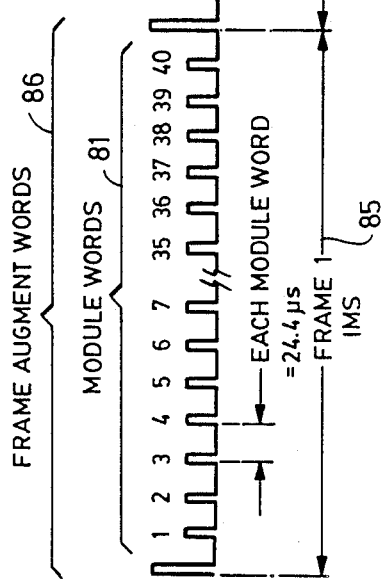
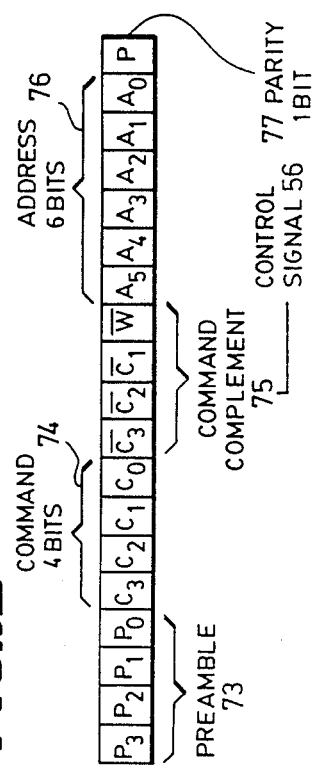
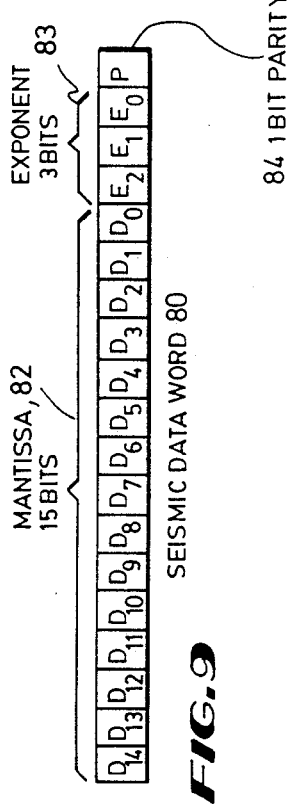

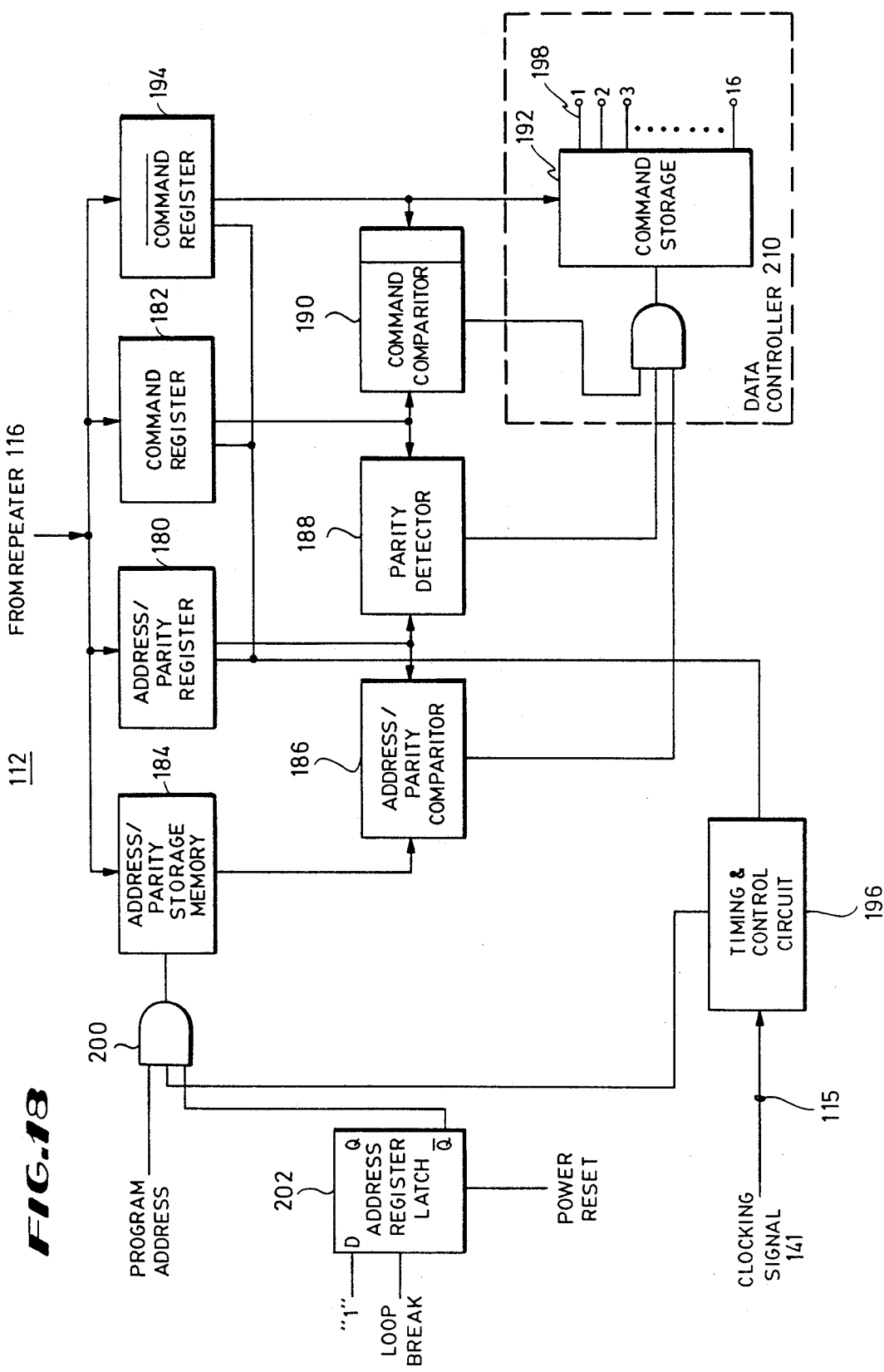

DIGITAL MARINE SEISMIC SYSTEM

This is a continuation of co-pending application Ser. No. 07/160,613 filed on 2/26/88, now abandoned, which is a continuing application of application Ser. No. 07/160,613 filed on Feb. 26, 1988, now abandoned, in-part of application Ser. No. 621,495, filed June 18, 1984, (now abandoned), the disclosures of which are incorporated herein by reference.

REFERENCES TO PATENTS OF RELATED SUBJECT MATTER

"Installation for the Transmission of Multiplexed Seismic Signals," U.S. Pat. No. 3,652,979, issued Mar. 28, 1972, to Philippe Angelle (the CGG patent); "System for the Multiplexed Transmission of Signals from Seismic Receivers," U.S. Pat. No. 3,986,162, issued Oct. 12, 1976, to Roger Cholez et al. (the SERCEL patent); "Seismic Data Telemetering System," U.S. Pat. No. 3,996,553, issued Dec. 7, 1976, to Lee E. Siems and Paul M. Morgan (the WESTERN #553 patent); "Multichannel Seismic Telemeter System and Array Former," U.S. Pat. No. 4,072,923, issued Feb. 2, 1978, to Lee E. Siems and Paul M. Morgan (the WESTERN #923 patent); "Decentralized Seismic Data Processing System," U.S. Pat. No. 4,092,629, issued May 30, 1978, to Siems, Morgan, and Savit (the WESTERN #629 patent); and "Sampled Towed Array Telemetry," U.S. Pat. No. 4,464,739, issued Aug. 7, 1984, to Arthur L. Moorcroft (the MOORCROFT patent).

FIELD OF THE INVENTION

The present invention relates generally to a method and apparatus for transmitting digitized seismic data over a marine cable and more particularly relates to a system and apparatus for digital time division multiplexing of a large number of seismic channels in a marine cable.

BACKGROUND OF THE INVENTION

In marine seismic exploration, operators on a boat generate sound waves from a location remote from the boat. The boat tows a cable (often times referred to in the trade as "a streamer"), in which sensors are disposed to detect the reflection of the sound waves from the ocean floor. In order to obtain accurate data, geologists prefer to employ many sensors which are arranged in short arrays and which are closely spaced in the marine streamer. Analog transmission of such data has typically required hundreds of telecommunication channels in the marine streamer.

The above identified CGG patent suggests applying telemetry techniques to a land seismic system, where multiplexing techniques are employed to reduce the number of wires to a single, two wire transmission line. A plurality of geophones were connected to the transmission line, and each geophone was connected via its own multiplexing circuit to the transmission line. The multiplexing circuits for the respective goephones were connected in parallel to the transmission line. Each circuit stored an address representative of its order of connection to the line. The multiplexing of the signals described in the CGG patent required a pulse generator at the end of the transmission line opposite the recording unit which was recording the digitized seismic signals. The system described in the CGG patent suffered from both being limited to a small number of data channel in the transmission line and from having relatively slow data transmission rates.

In contrast to the parallel multiplexing arrangement of the CGG patent, the SERCEL patent disclosed a method of connecting the digitizing modules in series in the transmission line and were to be operated as follows. The acquisition of seismic data was a three-step process. First, a synchronization signal would be sent to all the modules to alert them that a request for data was coming. Then, multiple identical requests for data would be sent to all the modules. As a module received such a request, it would put its data in the time gap behind the request, and alter the request so that subsequent modules would not recognize the request, thus allowing the request to pass through with its data to the central recording unit. Also, as each module received and responded to a request for data, it would deactivate itself so as to be unresponsive to future requests for data, until it received another synchronization signal.

Although the system disclosed in the SERCEL patent allowed both the pulse generator and recording unit to be located at the shipboard end of the transmission line, it still had limitations. The modules were all identical and not individually addressable. Although having identical modules facilitated repair and replacement, a specific module could not be communicated with or controlled without communicating with and controlling the remaining modules. Thus, the Sercel patent did not appear to disclose selective addressing or commanding. Another limitation was that the Sercel patent disclosed multiplexing words containing only 18 bits of data in each 32 bit word, resulting in a reduced transmission efficiency. Another limitation was that since all the requests for data returned to the boat in an altered form, there was no way to see if the request had been properly transmitted.

The WESTERN '553 patent attempted to solve the problem of non-addressable modules, while retaining replacement and repair advantages realized by utilizing identical modules. It disclosed a method of propagation delay addressing. In such a method, an interrogation signal and a control signal are placed on respective transmission lines having differing propagation velocities. By controlling when the interrogation and control signals are generated on the respective transmission lines, the module at which the control and interrogations signals become coincident is thus "addressed." Although the WESTERN '553 patent disclosed identical addressable modules, it still had significant limitations. Standard use required the modules to be evenly spaced along the cable, and three different transmission links were required: one each for interrogation, control, and data, although the patent did theorize that the interrogation and control channels could be multiplexed onto a single line.

The WESTERN #923 patent appears to be an improvement over the previous patent, WESTERN #553, involving in part the determination of the location of a digitizing module based on the time interval between the application of an interrogation signal and a time of receipt at the control center of the digital signal from the digitizing module.

The WESTERN #629 patent appears to apply the above principles of the Western '553 patent to a marine streamer that is towed behind a boat. However, the system described in these patents is not the optimum solution to marine streamer needs.

Generally, the systems of the WESTERN patents appear to require three links (two twisted pairs and one coaxial cable) in order to receive data (in the form of digitized data words) from the modules. A further limiting factor is the stated need for a wide bandwidth of 100 MHz. (This need is stated on page 14 under "Remarks" in one of the papers in the file history of the WESTERN #629 patent.)

It is believed desirable to have a more versatile module, which will require only a single twisted-pair transmission link for data transmission to the central unit. Such a module optimally would not require a wide bandwidth and short data words, could be selectively addressed, would be responsive to a wide variety of commands, and would have a high transmission efficiency.

The MOORCROFT patent limits its disclosure of addressing modules to simultaneous sampling at each array module (Column 2, lines 42-45; Column 3, lines 48-51; Column 5, lines 55-56; and Column 6, lines 1-3 and 28-31), implying that all modules are addressed together as a group. Furthermore, the patent discloses no means for uniquely addressing one single module to the exclusion of all other modules in the system.

SUMMARY OF THE INVENTION

The present invention overcomes the above-noted and other problems by providing a new and improved digital marine seismic system capable of employing a transmission coding structure which uses a large multi-bit word and which allows selective addressing of given data acquisition control modules. Each control word contains a specific command and an address of a specific module, and yet contains enough data capability to result in a data transmission efficiency of over 80%. Any one of sixteen different commands can be sent at any time to a selected module. Thus, the modules in the present invention function not merely as devices to measure and transmit sound waves, but rather function as remote controllers of a complex data gathering system.

An important feature of the invention is a novel controller/digitizer in each data acquisition control module. A plurality of hydrophones are connected to each module for generating analog signals representative of geological formations. The controller/digitizer simultaneously digitizes the analog signals from the hydrophones for telemetry back to the boat. The simultaneous digitizing is in response to a specific command of the control word and provides a fast and accurate representation of the data contained in the analog signals.

As another important feature of the invention, the selected data acquisition control module includes means to selectively program each module with its own unique address upon initially applying power to the cable system. Each module has an address comparator circuit. Whenever a module receives a command from the shipboard electronics, the comparitor circuit compares the address associated with the command with its own address. The module responds to the command only if the addresses are the same. Thus, the present invention accomplishes selective addressing of modules, while also allowing all modules to have identical and interchangeable hardware prior to initial programming. Repair and replacement of the modules are thus greatly facilitated, and the seismic boat does not require a large inventory of different replacement modules. To accomplish selective addressing and commanding, the present invention uses merely a single 2-wire standard twisted-pair transmission loop, instead of several twisted pairs or coaxial cables. This results in lower installation cost and greater reliability.

Another feature of the invention is the high speed clock synchronization circuit in each module that regenerates both the amplitude and phase of the incoming signal. This circuit instaneously phase locks the internal crystal controlled oscillator to the input telemetry data word.

Another feature of the invention is an echo-back circuit in each module which returns to the ship the command word received by that module. Since in the present invention the modules do not alter the command or address received, the shipboard electronics uses the echo-back circuit in each module to verify that the correct command and address was sent. All transmitted commands are echoed back and tested for their validity by the shipboard receiver electronics.

Another feature of the invention is the provision of a power isolation relay in each module. This relay is in communication with the shipboard electronics, and in response to the command word from the ship can either apply power or shutdown power to all downstream modules that are connected on the cable more remotely from the ship. This feature allows each module to be individually and remotely checked for proper power consumption and malfunctions.

Another feature of the invention is the use in each module of a depth gage and associated circuitry for transmitting the depth of that module to the ship.

It is thus a general object of the present invention to provide a new and improved marine telemetry system which is versatile, reliable, of increased data and transmission capability, has low power consumption, and yet is inexpensive to manufacture.

BRIEF DESCRIPTION OF THE DRAWINGS

Other features and advantages of the present invention will become apparent by referring to the following detailed description of a preferred embodiment in connection with the accompanying drawings, wherein like referenced numerals refer to like elements throughout all the figures. In the drawing:

FIG. 2 is a schematic diagram showing data acquisition control modules employed in the marine seismic system of FIG. 1;

FIG. 3 is a more detailed schematic diagram of one of the data acquisition control modules depicted in FIG. 2;

FIG. 9 is a diagram depicting the bit format within the seismic data portion of the 256-bit control word associated with the data acquisition control modules;

FIG. 11 is a timing diagram illustrating the timing of the words generated by the shipboard control system and the data acquisition control modules;

FIG. 12 is a diagram depicting the bit format within the control signal portion of the 256-bit control word associated with the data acquisition control modules;

FIG. 13 is a diagram depicting the bit format employed for the 256-bit control words associated with the data acquisition control modules;

FIG. 18 is a schematic diagram of the command/address detector circuit, the timing and control circuit, and the data controller circuit of the data acquisition control module;

DETAILED DESCRIPTION OF A PREFERRED EMBODIMENT

General Arrangement

Figure 1:
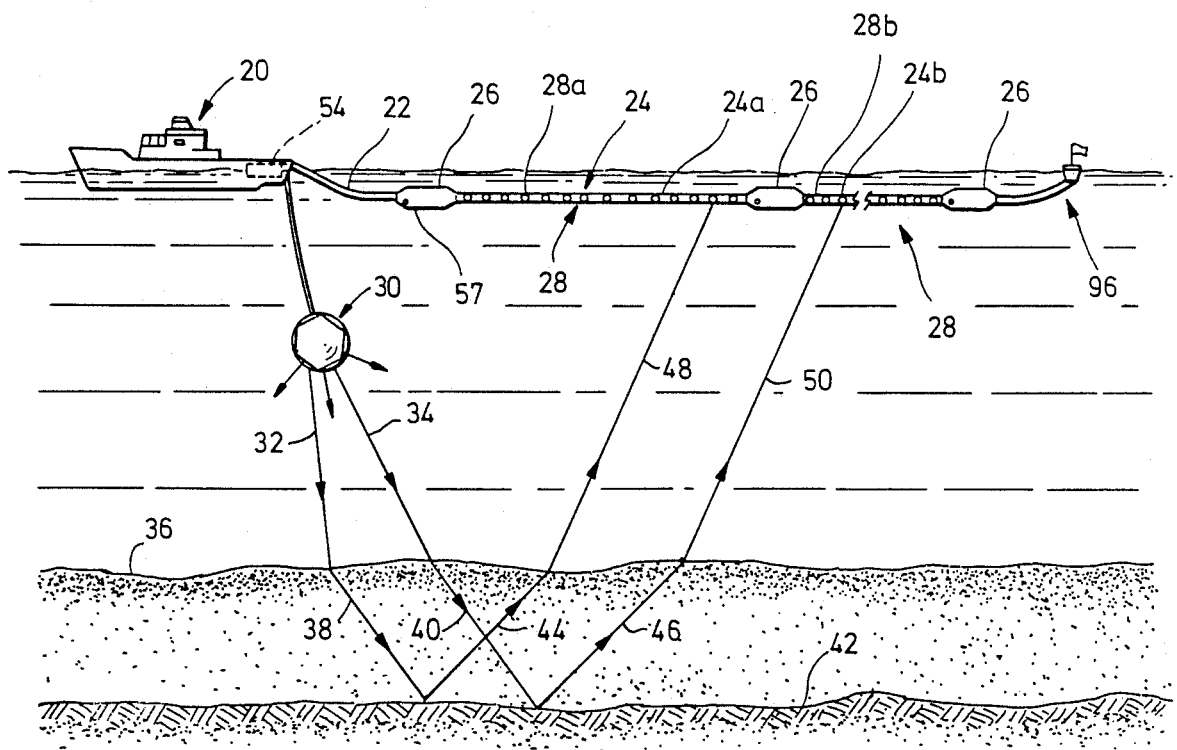
FIG. 1 is a general overall schematic view of an illustrative digital telemetry marine seismic system deployed in the ocean, towed behind a boat.

Referring to FIG. 1, a sea-worthy boat 20 pulls a digital telemetry marine seismic system (referred to hereafter as cable 22) through the ocean. Such a cable 22 is sometimes referred to in the industry as a marine streamer. As is known in the art, the cable 22 includes a flotation medium such as kerosene which gives neutral buoyancy to the cable 22, thus allowing the depth of the cable 22 to be controlled and maintained.

The cable 22 is composed of up to forty or more sections 24 which are serially connected via a transmission medium to allow the telemetry of data back to the ship 20. Each section 24 contains a data acquisition control module 26 electrically connected to receive analog output signals generated by twelve groups of hydrophones 28. Each module 26 digitizes the analog signals in preparation for transmission to the boat 20 via the transmission medium. A representative module 26 is shown in an electrical schematic in FIG. 2 and is shown structurally in FIG. 19, displaying some of the circuit boards.

The boat 20 also tows a seismic sound source 30 through the water. The sound source 30 generates sound waves which are reflected from the ocean floor in a manner indicative of geophysical formations in the ocean floor. The sound waves travel along a variety of paths, such as path 32 and path 34, to the ocean floor 36. At the floor 36 the sound waves are refracted due to the difference in velocity of sound in water and in the earth. The refraction causes the sound waves to travel along a variety of refracted paths, such as paths 38 and 40. The sound waves thereafter are reflected from various subsurface formations, such as subsurface formation 42. After reflection from the subsurface formation 42, the sound waves travel along a variety of paths, such as the reflected paths 44 and 46, to the surface of the ocean floor, where they are again refracted. The sound waves thereupon travel along a variety of paths such as 48 and 50 through the water, and they reach the cable 22.

Sound waves traveling along wave paths nearer the boat 20, such as ray path 48, will be detected by the twelve groups 28a of hydrophones in the near section 24a of the seismic cable 22. Other sound waves will travel along wave paths such as path 50 and will be detected by the twelve groups 28b of hydrophones in the more distant sections such as the section 24b of the seismic cable 22. In response to the sound waves, the twelve groups of hydrophones 28 generate twelve analog signals 52 (FIGS. 2, 3) representative of the sound waves, and the signals 52 are communicated to the modules 26.

A digital measurement and control system 54 is disposed on the boat 20 and is connected to the cable 22. The system 54 generates control signals 56 for generally controlling operations of the modules 26. Especially the control signals 56 command an analog signal processor 58 of the given module 26 to simultaneously digitize all twelve analog signals 52 into digitized signals 60. The modules 26 then transmit that digitized seismic data 60 to the control system 54 for processing.

Other than generate the control signals 56 in the proper format, the system 54 forms no part of the invention. Conventional digital signal generation and processing techniques may be employed in light of the description given herein to implement the system 54.

Transmission Coding Structure

The basic transmission coding structure used in this invention is well-known in the telecommunication art and is in widespread use today. This coding structure satisfies several coding requirements for optimal usage: (1) No significant dc component exists within the transmission spectrum. (2) The energy spectrum is suitably shaped with very little energy at low frequencies. (3) The data exhibits adequate timing information content. (4) The coding scheme is transparent to all binary information signals. This latter consideration is advantageous since no restrictions should be placed on the digitized seismic data 60 to be returned to the boat 20. (5) The coded signal is capable of being uniquely decoded to produce the original seismic information signal.

Figure 14:
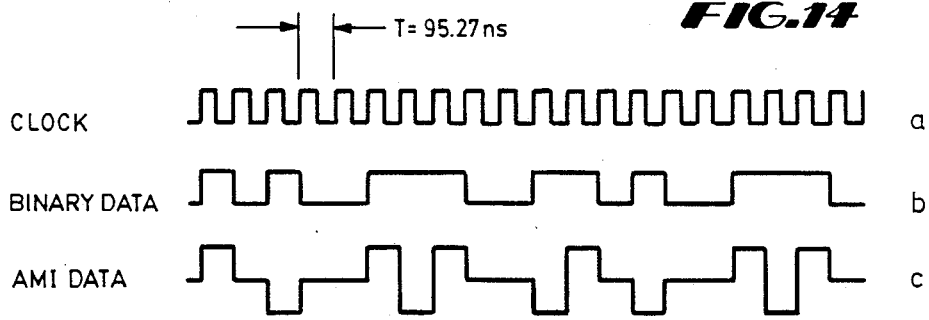
FIG. 14 is a timing diagram illustrating alternate mark inversion encoding employed in a preferred embodiment of the invention.
Figure 15:
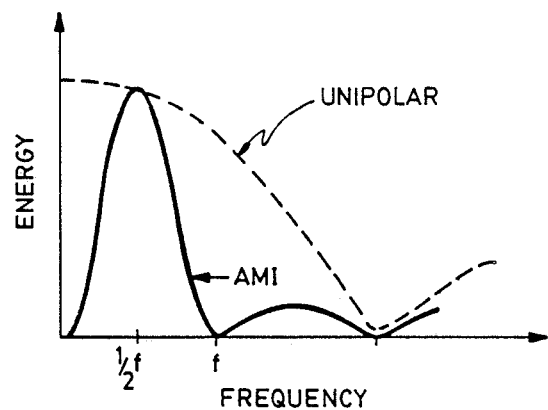
FIG. 15 is a graph comparing the energy spectrums of alternate mark inversion and unipolar encoding techniques.

The coding utilized in the invention is a modified or enhanced version of the alternate mark inversion (AMI) encoding scheme. This encoding process generates positive and negative marks alternately each time a binary logic one condition occurs within the signal. As seen from the example of FIG. 14 showing a CLOCK, a BINARY DATA pulse train, and an AMI DATA pulse train, the DC component existing in the unipolar BINARY DATA pulse train is removed by the AMI encoding scheme as represented by AMI DATA. This also places the principle energy components in one-half the band width (See FIG. 15) when compared to the bandwidth of a unipolar binary data pulse train.

Referring to FIG. 12, the control signal 56 is composed of five portions: a four-bit preamble 73, a four-bit command 74, a four-bit command complement 75, a six-bit address 76, and a one-bit parity 77. The command 74 can be any one of sixteen different commands. The address 76 has sixty-four unique possibilities of addresses, although the preferred embodiment addresses only forty different modules 26.

The sixteen commands 74 which are available in the preferred and illustrated embodiment are as follows:
1. NO OPERATION
2. GROUND INPUTS
3. ENABLE HYDROPHONES
4. ENABLE IMPULSE
5. ENABLE HYDROPHONE STEP
6. LC FILTER IN
7. LC FILTER OUT
8. SAMPLE SEISMIC DATA
9. SAMPLE AUXILIARY DATA
10. ECHOBACK DISABLE
11. PROGRAM ADDRESS
12. OFFSET CORRECTION SEQUENCE
13. ENABLE POWER
14. (SPARE)
15. EXTRACT DATA
16. (SPARE)

Referring to FIG. 13, the space between successive control signals 56 is a time gap of sufficient duration to allow room for the modules 26 to supply a field of 216 bits of digitized seismic data 60, a parity bit 78, and an eight-bit interword gap 79. The field of the seismic data is composed of twelve 19-bit seismic data words 80 (FIG. 9). The control signal 56 in combination with the field of the seismic data 60, the parity bit 78, and the interword gap 79 constitutes a 256-bit data acquisition control module word 81. Dividing the 216 bits of data by the 256 bits of the total length of the word 81, gives a transmission efficiency of 84.3%.

Referring to FIG. 9, the format of the seismic data word 80 is shown in detail. A mantissa 82 is composed of fifteen bits; and exponent 83 is composed of three bits, and one bit of the seismic data word 80 is reserved for a parity bit 84. The parity bit 84 is used for parity-checking.

A plurality of module words 81 define a frame 85. In the preferred embodiment a system clocking rate of 10.5 MHz is used, and each 256-bit data acquisition control module word 81 is 24.4 microseconds in duration. Since the cable 22 can contain up to forty data acquisition control modules 26, a time frame 85 of one-millisecond is employed to accommodate forty 256-bit module words 81. A frame alignment word 86 is provided at the beginning of each frame 85. The frame alignment word 86 and the module word 81 exhibit generally the same bit format with the only distinction between the two simply being a change in the command portion 74. This facilitates the use of simple decoding circuitry in the data acquisition control modules 26. It is seen from FIG. 11 that each time frame 85 is divided into forty-one time slots of equal duration. Thus, the frame structure utilized in the preferred marine telemetry system has a "regular" format.

The overall shipboard/cable multiplexing procedure employed by the preferred embodiment is referred to as "word interleaved". Since the shipboard control system 54 must be able to identify which time slot is associated with each channel, a predetermined recognizable binary sequence (the frame alignment word 86) is periodically transmitted by the shipboard system 54 and interleaved with the module words 81. This sequence is used to align shipboard demultiplexing circuitry with the cable multiplexing scheme. As used herein the term frame thus will mean a set of consecutive time slots in which the position of time slots can be identified by reference to a frame alignment signal.

The Data Acquisition Control Module 26

Referring to FIG. 2 and to FIG. 3, the data acquisition control modules 26 are commonly connected to the control system 54 by first and second conventional twisted pair (wire) transmission links 92, 94 extending the length of the seismic cable 22. The links 92, 94 respectively are unidirectional with respect to the shipboard control system 54. The line 92 transmits away from the boat 20 towards the remote end 96, and the link 94 transmits toward the boat 20 from the remote end 96.

Each data acquisition control module 26 contains a regenerative repeater 98, a controller/digitizer circuit 100, a transceiver 102, an echo-back circuit 104a, 104b, a depth sensor circuit 106 (FIG. 3) for measuring the depth of the module 26 in the ocean, a regulated power supply 109, and a power isolation relay 110 for selectively applying power to the modules 26. The regenerative repeater 98 is connected in the link 92 and repeats and retransmits each control signal 56 towards the end 96. The circuit 100 is coupled in the link 94 to receive the analog signals 52 for simultaneously digitizing them under control of the control signal 56. The transceiver 102 contains a command/address detector 112 for detecting the address of the module 26 in the control signal 56. Only upon detection of the proper address 76 will the module 26 respond to certain control signals 56. Upon receipt of the proper control signal, containing a "EXTRACT DATA" command 74, the transceiver 102 multiplexes the digitized signals from the circuit 100 onto the link 94.

Upon initial power-up of the system 54 only the module 26 closest to the boat is provided with power through the regulated power supply 109. The power relay 110 in each module 26 is open when power is initially applied to the system 54. The power relay 110, being open in the first module 26, results in both positive and negative lines 107 of the power cable being broken to all subsequent modules. Thereafter each module 26 receives its electrical power sequentially from the shipboard control system 54. This feature allows the shipboard operator to check the first module 26 for proper power consumption. When the shipboard operator is satisfied that the first module 26 is consuming the proper amount of power, he sends to the first module 26 a control signal 56 containing an "ENABLE POWER" command 74 requesting the relay 110 to close. This provides power to the first two modules 26. If the first two modules 26 are not consuming the proper amount of power, the operator knows he has a problem with the second module 26. This process is repeated until all modules 26 have power.

The echo-back circuit 104 includes switches 104a and 104b connecting the lines 92 and 94, and is employed in the foregoing powering-up process. The switch 104a when activated opens the link 92, and the switch 104b opens the link 94. A connection 95 connects the link 92 to the switch 104b to couple the output of the repeater 98 into the input of the transceiver 102. This operation hereafter will be referred to as the "echo back" operation by the echo-back circuit 104. The circuit 104 is activated so that upon applying power to the cable 22 the control signal 56 from the link 92 is echoed back from the module 26 closest to the ship to the shipboard control system 54 via link 94. The system 54 is thereby able to monitor proper receipt of the signal 56 by the appropriate module 26.

Programmable Addresses 76

The "echo-back" feature also provides an efficient way to program a unique address 76 into each module 26. A command signal 56 containing a "PROGRAM ADDRESS" command 74 is sent from the shipboard control system 54 requesting that the address 76 be stored. Since the echo-back circuit 104 is activated, this command can only communicate with the first module 26. Thus, the first module 26 is associated with its own unique address 76 which is stored in the first module 26. Once the unique address 76 has been stored by the module 26, a control signal 56 containing an "ECHOBACK DISABLE" command 74 disables the module 26 from responding to subsequent "PROGRAM ADDRESS" commands directed to the remaining modules 26. The module 26 closest to the boat 20 retains the unique six-bit address 76 until power is removed from the system. The same "ECHOBACK DISABLE" command 74 also requests the circuit 104 to deactivate, and thus the connection 95 between links 92 and 94 is broken, allowing the next control signal 56 to pass through to the second module 26, where the process repeats.

A second unique address 76 is sent in the control signal 56 with the "PROGRAM ADDRESS" command 74 to store the address 76. Since the module 26 closest to the boat 20 has had its address programming capability disabled, only the second module 26 responds. The "PROGRAM ADDRESS" command 74 is immediately followed by an "ECHOBACK DISABLE" command 74 to disable the capability of the second module 26 to be programmed with a new address 76. Thus, the second module 26 from the boat 20 is programmed with its own unique address 76 which it will retain until power is removed from the system. This process continues until all the modules 26 have each received a "PROGRAM ADDRESS" command 74.

The control signal 56 passes through each module 26 until it reaches the last module 96. The last module 96, not having received an "ECHOBACK DISABLE" command 74 in a control signal 56, echos back the control signal, via the transmission link 94, to the shipboard control system 54. Thus, during operation of the cable 22, the control signals 56 from the control system 54 pass via the link 92 through all of the modules 26 to the last module 96. At the last module 96 the control signals 56 are echoed back through the echo-back circuit 104 via link 94 to all of the transceivers 102 of the data acquisition control modules 26. At the modules 26, the digitized, sound-wave data 60 are collected and inserted into the link 94 in the time gap behind the control signals 56 on their way back to the shipboard control system 54.

The sequence of events upon supplying power to the cable 22 is as follows. The module 26 closest to the boat 20 is checked for power consumption, and commands 74 are sent: (1) to program an address 76 ("PROGRAM ADDRESS"), (2) to refuse further attempts to program an address 76 and to activate the echo-back circuit 104 ("ECHOBACK DISABLE"), and (3) to close the power relay 110 ("ENABLE POWER"). This sequence is then repeated for all the modules 26 except that the "ECHOBACK DISABLE" command 74 is not sent to the last module 96.

Referring to FIG. 3, the regenerative repeater 98, the controller/digitizer 100, and the transceiver 102 of the data acquisition control module 26 are shown in greater detail.

The regenerative repeater 98 contains an input coupler 111 which receives as its input the control signal 56 from the twisted pair transmission link 92. A clock synchronizer 114, a serial repeater 116, and a preamble detector 118 have their inputs commonly connected to the output 113 of the coupler 111. The preamble detector 118 is also coupled to the output line 115 of the clock synchronizer 114, and in turn has its output coupled as an input to the serial repeater 116. The output line 115 of the clock synchronizer 114 is also coupled to the repeater 116. An output coupler 120 is provided to couple the output of the repeater 116 to the link 92.

Figure 4:
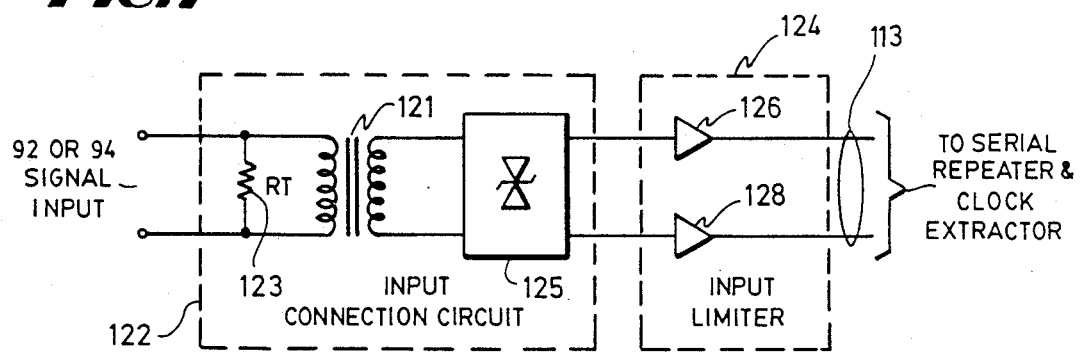
FIG. 4 is a schematic diagram depicting an input coupler employed in the data acquisition control module of FIG. 1.

The input coupler 111 is shown in detail in FIG. 4 and includes a connection circuit 122 and an input limiter 124. The connection circuit 122 is coupled to receive the control signal 56. The connection circuit 122 comprises the serial connection of a transmission line terminating resistor 123, an input isolation transformer 121, and an input over-voltage protector 125. From the connection circuit 122 the control signal 56 passes to the input limiter 124. The limiter 124 contains a positive threshold detector 126 and a negative threshold detector 128 respectively to accommodate dual rail data encoding such as AMI encoding. The detectors 126, 128 indicate on a pair of lines 113 whether bits of the control signal 56 are a binary 1 or 0. The output lines 113 from the input coupler 111 are the input to the serial repeater 116, to the clock synchronizer 114, and to the preamble detector 118.

Clocking Synchronization Circuit 114

Figure 6:
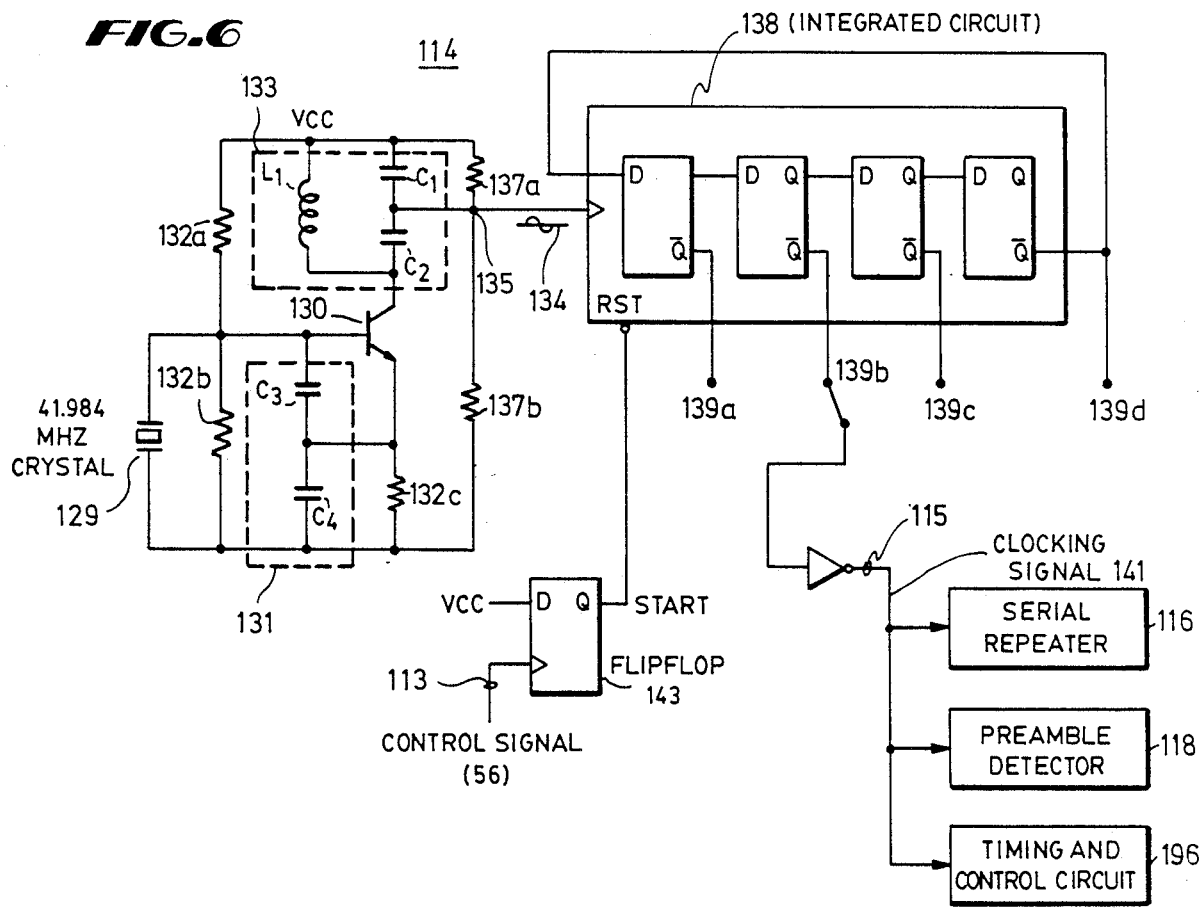
FIG. 6 is a schematic diagram of a clock synchronization circuit employed in the data acquisition control module of FIG. 3.

Referring now to FIG. 6, the clock synchronization circuit 114 uses a high frequency crystal controlled oscillator of the modified Colpitts type. A crystal 129 develops a 41.984 MHz signal in the base circuit of a transistor 130. A capacitive voltage divider 131 provides feedback to sustain oscillation. Biasing resistors 132a, 132b, and 132c bias the transistor 130 in its active region. A tuned circuit 133 is connected to the collector of the transistor 130 to produce a frequency twice that of the 41.984 MHz signal developed by the crystal 129. The tuned circuit 133 is resonant at the second harmonic of the crystal 129, thus generating a high voltage sine wave 134 at the output node 135. The resonant frequency ($f_{res}$) in hertz of the sine wave 134 generated at node 135 is calculated by the following formula:

$$f_{res} = \frac{1}{2\pi} \left[ \frac{L_1 C_2 C_1}{C_1 + C_2} \right]^{-\frac{1}{2}} \qquad \text{(Equation 1)}$$

where:
- $L_1$ is the inductance in henrys of the inductor labeled $L_1$ in the tuned circuit 133 in FIG. 6, and
- $C_1$ and $C_2$ are the capacitances in farads of the capacitors labeled $C_1$ and $C_2$ in the tuned circuit 133 in FIG. 6.

Level shifting resistors 137a and 137b shift the voltage level of the sine wave 134 at node 135 so as to be compatible with the integrated circuit 138. Integrated circuit 138 is configured as a four-stage divide-by-eight phase counter. Four phase taps 139a, 139b, 139c, and 139d are selectable by the operator of the invention to select the proper phase so as to provide clocking at the center of the bit cells of the control signal 56. (See FIG.

7a and 7c.) Since the resonant frequency of 83.968 MHz is an input to the integrated circuit 138, the frequency of the output clocking signal 141 is therefore 10.496 MHz. As shown in FIG. 6 and also in FIG. 3, the clocking signal 141 is the input to the serial repeater 116 and the preamble detector 118.

Figure 7:
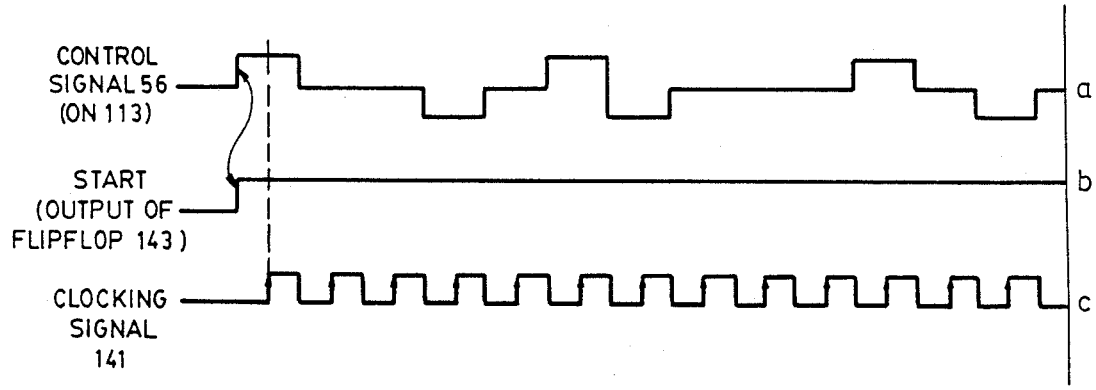
FIG. 7 is a set of typical waveforms of signals in the clock synchronization circuit depicted in FIG. 6.

Referring now to FIGS. 6 and 7, flip-flop 143 receives the control signal 56 on line 113 and in response to the leading edge of the control signal 56 generates the "start" signal. As shown in FIG. 7a and FIG. 7b, the start signal begins with the leading edge of the control signal 56. The start signal releases the reset input on integrated circuit 138. The integrated circuit 138 generates the clocking signal 141 which is ⅛ the resonant frequency of the sine wave 134 which is generated at output node 135.

Referring back to FIG. 7c, as mentioned earlier, the phase time of the output clocking signal 141 is selected to coincide with the center of the bit cells of the control signal 56 in addition to the remaining bits of the module word 81. The clocking synchronization circuit 114 provides suitable accuracy so that bit cell synchronization is achieved throughout the 256-bit module word 81 without further resynchronization. This type of synchronization scheme offers instantaneous locking of the clocking signal 141 on line 115 to the control signal 56 on line 113 within the first bit cell period. In contrast, prior art phase-locked loop techniques require a considerably longer time frame to accomplish this same result.

This method of timing extraction allows the large 256-bit data acquisition control module word 81 to be regenerated without use of: (1) phase locked loop type clocking schemes which are difficult to phase synchronize and require long signal acquisition capture periods, and (2) LC oscillators which are subject to temperature drift and therefore not useful for long data word packets.

The signal 56 is communicated to the preamble detector 118 which checks the signal 56 for a valid preamble 73. The preamble detector 118 is hard-wired to detect a unique bit sequence. If a valid preamble 73 is detected, the signal 56 passes through the serial repeater 116 to the output coupler 120.

Figure 5:
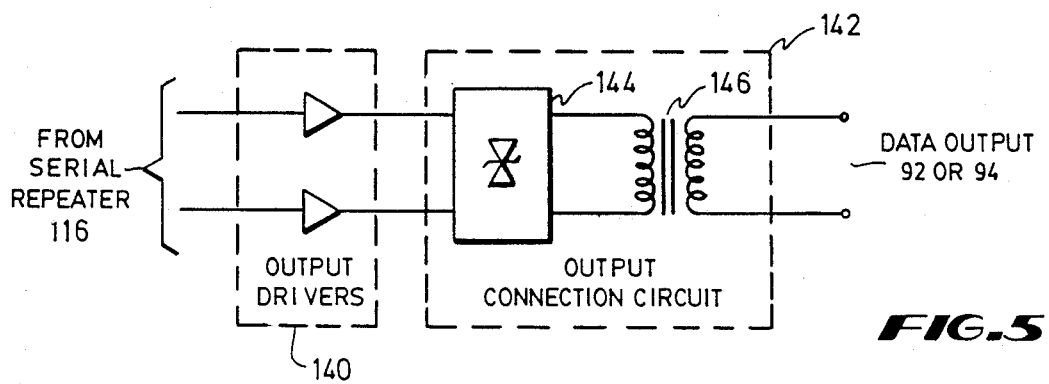
FIG. 5 is a schematic diagram depicting an output coupler employed in the data acquisition control module of FIG. 1.

The output coupler 120 is shown in FIG. 5 and includes a pair of output drivers 140. The output of the serial repeater 116 is connected to the input of the output drivers 140. After the control signal 56 passes through the drivers 140, it passes to an output connection circuit 142. The circuit 142 contains an output overvoltage protector 144 coupled to an output isolation transformer 146. From the transformer 146 the control signal 56 passes directly to the twisted pair transmission link 92, to the next data acquisition control module 26.

The signal 56 returning from the last data acquisition control module 96 passes through the twisted pair transmission link 94 into the transceiver 102 of each data acquisition control module 26. The signal 56 passes through various circuits in the transceiver 102 which are similar to circuits in the regenerative repeater 98: for example, the input coupler 111, the clock synchronizer 114, the preamble detector 118, and the serial repeater 116. However, once a valid preamble 73 has been detected, the signal 56 then passes to the command/address detector 112.

Command/Address Detector 112, Controller/Digitizer 100

Figure 10:
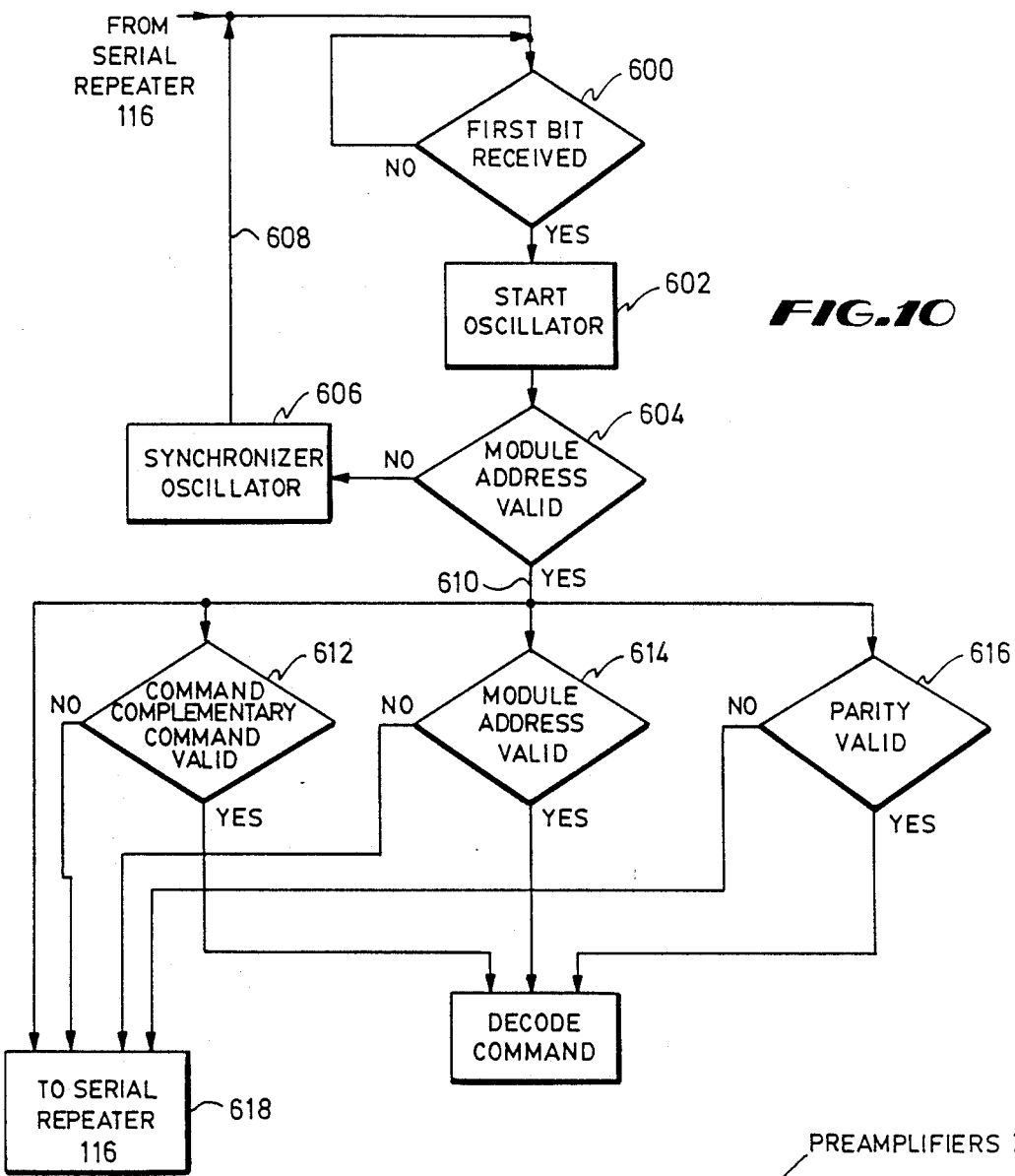
FIG. 10 is a flow diagram illustrating the logic operation of the command detector and address detector sections of the transceiver unit of the data acquisition control module.

FIG. 10 represents a flowchart overview of the system operation. Upon the reception (step 600) of a logic one data bit in the control word 71, the oscillator 134 is synchronized (step 602). A preamble 73 exhibiting a unique bit sequence is tested for validity at step 604. If the preamble is invalid, the oscillator 134 is stopped (step 606) and system control returns at 608 to a state where the module 26 is awaiting the reception of a logic one bit. If a valid preamble 73 is detected (at 610), the preamble and the command and address are repeated to the next module 26 in the cable 22. In addition the command 74, address 76, and parity 77 are all tested (at 612, 614, 616) for validity before a command 71 is decoded and utilized by the module 26. If either the command, address, or parity are invalid, the module 26 does not respond to the command signal 56. This is shown in FIG. 10 as a flow to the serial repeater 116 in logic box 618 for transmission to the next module 26.

The circuits of the command/address detector 112 are shown in FIG. 18. The detector 112 includes a seven bit address/parity register 180 in which six bits are allocated for address and one bit is reserved for parity. The detector 112 also includes a four bit command register 182, a four bit command complement register 194, a seven bit address/parity storage memory 184, an address/parity comparator circuit 186, a parity detector circuit 188, and a command comparator circuit 190. The registers 180, 182, 184, and 194 have their inputs coupled to the serial repeater 116 for receiving the control signal 56.

Also shown in FIG. 18 is the logic circuitry 198 which enables/disables upon initial power-up the storage of the unique address which identifies the respective modules 26. A gate 200 has its output connected to the address/parity storage register 184. One input to the gate 200 is from a timing and control circuit 196 and the other input is from the output of an address register latch 202.

The address register latch 202 is placed into a reset condition upon initial application of power to the module 26. This condition enables the gate 200 and thus allows a unique module address to be stored in the address storage 184, upon detection by the command detection circuits 182 and 194 of a valid "PROGRAM ADDRESS" command 74. Once the module address 76 has been stored, an "ECHOBACK DISABLE" command 74 is executed which sets the address register latch 202 to a set condition. This disables the gate 200 and thus prevents a subsequent "PROGRAM ADDRESS" command 74 from storing another address 76 in the address storage memory 184.

Also shown in FIG. 18 is the timing and control circuit 196, previously mentioned. The clocking signal 141 (FIG. 7c) on line 115 is applied to the timing and control circuit 196. The circuit 196 is a Johnson counter which supplies the correct time with respect to the incoming command word 71 to strobe or latch the address/parity register 180, the command register 182, and the complementary command register 194.

The output of the address/parity register 180 is compared by the address/parity comparator 186 to a preprogrammed module address 76 stored in the address/parity storage 184. For command security considerations the contents of the command register 182 and the contents of the complementary command register 194 are compared by the command comparator 190.

As a further check on command integrity the parity detector 188 is used to test parity of the address/parity register, command register and command complement register. If all the components of the control signal 56 are valid, i.e., proper address/parity, proper command and command complement, and proper parity, the command decode circuit 192 sends the decode 198 of the command 74 to the appropriate circuit.

For example, the decoded command 198 might be a command to open the echo-back circuit 104 and disable the address storage memory 184 and thus prevent the memory 184 from storing a new address ("ECHOBACK DISABLE"), or might be a command to close the power relay 110 ("ENABLE POWER"), or might be a command sent to the depth sensor circuit 106 to sample the output of the strain gage depth transducer ("SAMPLE AUXILIARY DATA"). As stated earlier, sixteen different commands can be sent from the control system 54.

Referring to FIG. 3, the controller/digitizer 100 comprises a data controller 210, a digitizer 212, and a seismic data memory 214. The data controller 210 controls the acquisition and manipulation of all data. If the command 74 is the request "SAMPLE SEISMIC DATA", the data controller 210 commands the digitizer 212 to simultaneously digitize the analog signals 52 from the twelve groups 28 of hydrophones.

Figure 8:
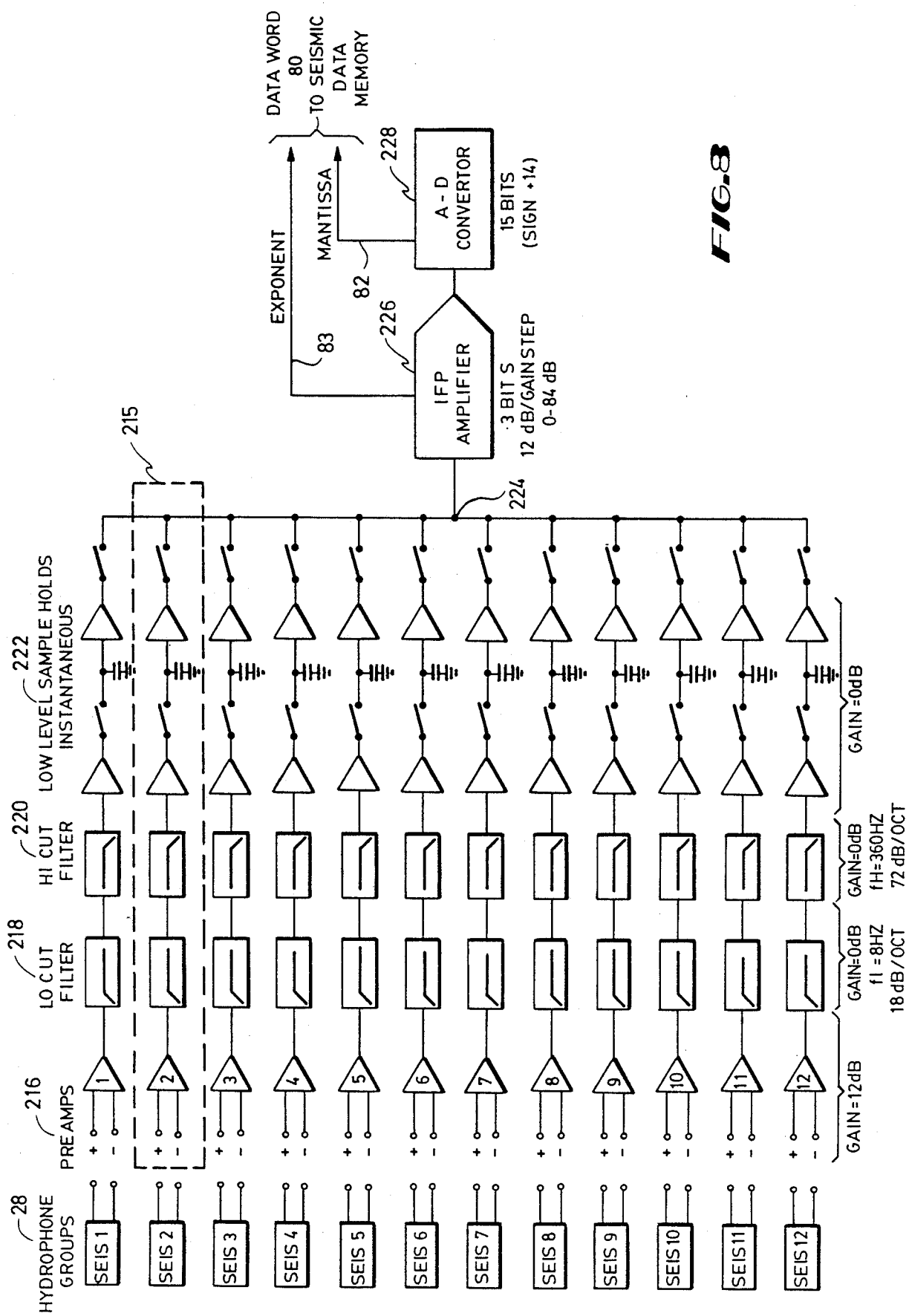
FIG. 8 is a schematic diagram of the digitizer unit of the data acquisition control module of FIG. 3.

The digitizer 212 is shown in FIG. 8. The digitizer 212 includes twelve channels of digitizers, one as represented at 215 for each of the hydrophone groups 28. Each digitizer channel includes the serial connection of a preamplifier 216, a high pass filter 218, a low pass filter 220, and a sample and hold circuit 222. The preamplifier 216 has a gain of 12 decibels. The high pass filter 218 has zero gain, a low frequency cut off of 8 Hertz, and an attenuation of 18 decibels per octave. The low pass filter 220 has zero gain, a high frequency cut off of 360 Hertz, and an attenuation of 72 decibels per octave. The circuit 222 has zero gain. The outputs of the twelve channels of sample and hold circuits 222 are commonly connected at 224 to the input of an instantaneous floating point amplifier 226. Any amplifier 226 can be used in the practice of the invention, but a state-of-the-art instantaneous floating, point amplifier may be used to advantage, such as one employing a microprocessor. The output of the amplifier 226 is connected to an analog to digital convertor 228. The three-bit output of the instantaneous floating point amplifier 226 forms the exponent 83 of the seismic data word 80. The fifteen-bit output of the analog-to-digital convertor 228 forms the mantissa 82 of the seismic data word 80. The seismic data word 80 is then fed to the seismic data memory 214 for storage. There are actually twelve data words 80 for which this process occurs simultaneously.

Upon receipt of an "EXTRACT DATA" command 74, the data controller 210 causes the twelve channels of seismic data 60 to travel from the seismic data memory 214 to the serial repeater 116 where they are multiplexed behind the 19-bit control signal 56 which had originally entered the transceiver 102, thus forming the 256-bit data acquisition control module word 81. (See FIG. 11). From the serial repeater 116 the module word 81 passes through the output coupler 120 and then out of the data acquisition control module 26 to the twisted pair transmission link 94 and thence on towards the shipboard digital measurement and control system 54.

Figure 19:
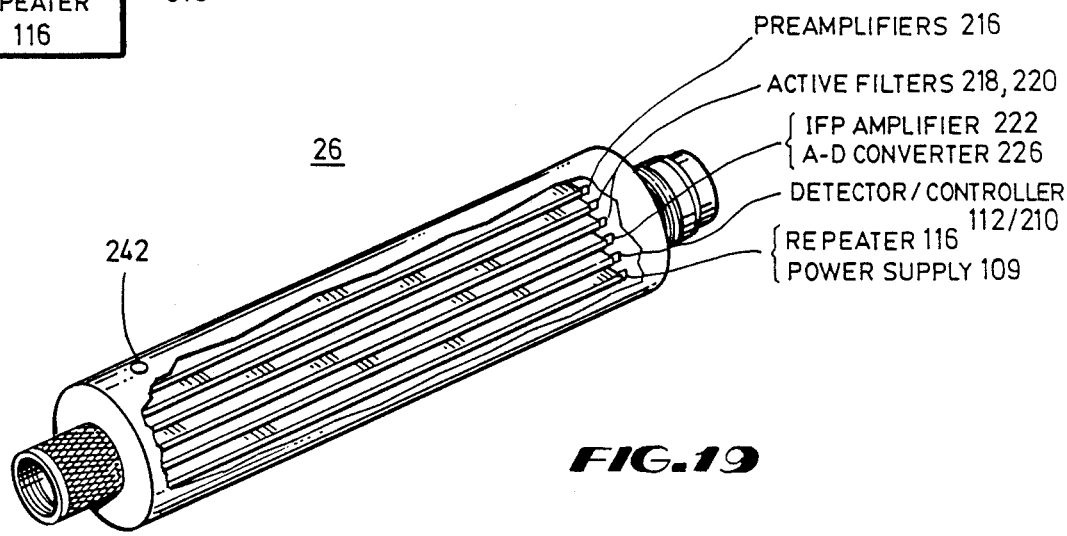
FIG. 19 is a perspective drawing of a data acquisition control module showing some of the circuits and the exterior port of the depth gage circuit.

Referring to FIG. 19, an exterior port 242 is shown for the depth sensor circuit 106. One of the commands 74 that is coded in the control signal 56 is a request for data from the depth sensor circuit 106. The circuit 106 includes a strain gage transducer 240 which is positioned inside the housing of the module 26 and which is in direct contact with the seawater through the exterior port 242. The location of the depth sensor circuit 106 inside the module 26 offers several advantages over other cable systems that have depth gages located in the cable section 24, rather than in the modules 26. This invention provides a large number of depth points for an extremely accurate representation of the streamer profile. Further, special cable sections dedicated only to depth measurement are not necessary. Finally, since the depth data of any module 26 and its associated cable section 24 of the cable 22 is multiplexed onto the link 94, acquisition of the depth data does not require a separate transmission link.

Figure 16:
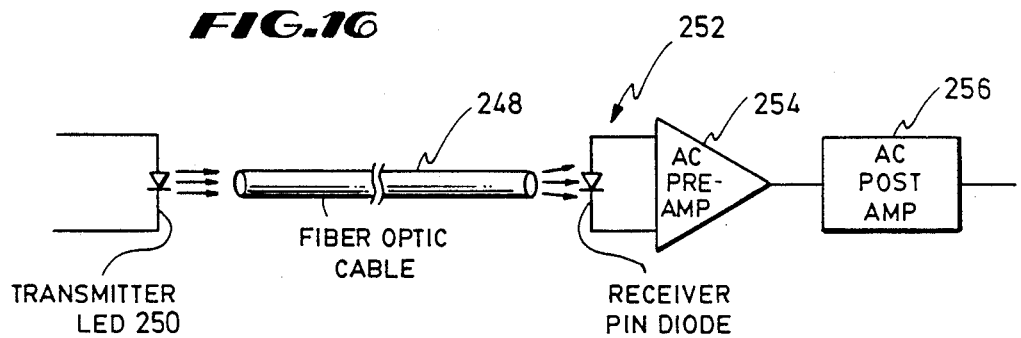
FIG. 16 is a schematic illustrating an alternative application of the invention using a fiber optic transmission medium in the marine cable.
Figure 17:
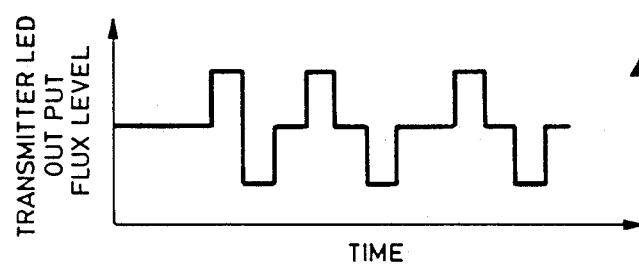
FIG. 17 is a diagram illustrating a typical output flux level of a transmitter employed in the fiber optic embodiment of FIG. 16.

Referring to FIG. 16, the system described may be easily adapted for use with fiber optic cables 248. The advantages set forth earlier pertaining to the alternate mark inverted AMI coding scheme are directly applicable to the fiber optic transmission scheme. A transmitter LED 250 may be biased to an average flux level which represents a logical-zero. Logic-ones can be represented by increasing or decreasing the flux level from this average point, thus creating a constant average dc output at the input of the receiver 252. This constant dc output may be easily removed so that ac amplification may be utilized to increase the signal for proper threshold detection. A pin diode may suitably be utilized as the receiver 252. A preamplifier 254 and a post amplifier 256 are then employed. FIG. 17 shows a typical output flux level.

Although a rather detailed embodiment of the present invention has been shown and described, it will be understood that it has been given by way of example only. Other embodiments within the scope of the invention will be readily apparent.

What is claimed is:

1. A digital marine seismic system adapted to be towed behind a ship for collecting sound waves representative of seismic signals, for generating digital data signals representative of the seismic signals, and for telemetering the digital data signals to shipboard control electronics, the shipboard control electronics being of the type which generates control signals for controlling the collecting, the generating, and the telemetering of the data, comprising:

(a) a seismic cable, including a data transmission system, adapted for being towed behind the ship, the transmission system including first and second transmission links defining a system wherein every control signal transmitted from the ship on the first transmission link returns unchanged on the second transmission link;

(b) a plurality of data acquisition control modules physically spaced along said cable at various distances from said shipboard control electronics, each said module being in communication with the shipboard control electronics via said first and second transmission links, and each module having means for receiving a plurality of analog seismic data signals and generating said digital data signals; and (c) a plurality of seismic sensors secured to said cable and adapted for generating said plurality of analog seismic data signals in response to the receipt of the sound waves.

2. A digital marine seismic system adapted to be towed behind a ship for collecting sound waves representative of seismic signals, for generating digital data signals, representative of the seismic signals, and for telemetering the digital data signals to shipboard control electronics, the shipboard control electronics being of the type which generates control signals in module words, each control signal containing the address of only the data acquisition control module to be addressed by that respective control signal, for controlling the collecting, the generating, and the telemetering of the data, comprising:
  (a) a seismic cable, including a data transmission system, adapted for being towed behind the ship;
  (b) a plurality of data acquisition control modules physically spaced along said cable at various distances from said shipboard control electronics, each said module being in communication with the shipboard control electronics via said data transmission system, each module including:
    (i) a regenerative repeater adapted for receiving and repeating away from the ship said control signals unchanged,
    (ii) a transceiver adapted for decoding the control signal and for telemetering on said data transmission system a digital seismic data signal in the module word following the unchanged control signal for that respective module, and
    (iii) digitizing circuit means for receiving a plurality of analog seismic data signals and generating said digital seismic data signal; and
  (c) a plurality of seismic sensors secured to said cable, and adapted for generating said plurality of analog seismic data signals in response to the receipt of the sound waves.

3. A digital marine seismic system adapted to be towed behind a ship for collecting sound waves representative of seismic signals, for generating digital data signals representative of the seismic signals, and for telemetering the digital data signals to shipboard control electronics, the shipboard control electronics being of the type which generates control signals in module words, each control signal containing the address of only the data acquisition control module to be addressed by that respective control signal, for controlling the collecting, the generating, and the telemetering of the data, comprising:
  (a) a seismic cable, including a data transmission system, adapted for being towed behind the ship, the transmission system including first and second transmission links each having a first end connected to the shipboard control electronics and a second end spaced therefrom;
  (b) a plurality of data acquisition control modules physically spaced along said cable at various distances from said shipboard control electronics, each said module being in communication with the shipboard control electronics via said first and second transmission links of said transmission system, each module including:
    (i) a regenerative repeater adapted for receiving and repeating energy control signal unchanged in a direction from the first end toward the second end of said first transmission link,
    (ii) a transceiver adapted for decoding the control signal and for telemetering on said second transmission link a plurality of digital seismic data signals in the module word following the unchanged control signal for that respective module, and
    (iii) digitizing circuit means for receiving a plurality of analog seismic data signals for generating said plurality of digital seismic data signals in accordance with said unchanged control signal; and
  (c) a plurality of seismic sensors secured to said cable and adapted for generating said plurality of analog seismic data signals in response to the receipt of the sound waves.

4. A digital marine seismic system adapted to be towed behind a ship for collecting sound waves representative of seismic signals, for generating digital data signals representative of the seismic signals, and for telemetering the digital data signals to shipboard control electronics, the shipboard control electronics being of the type which generates control signals for controlling the collecting, the generating, and the telemetering of the data, comprising:
  (a) a seismic cable, including a data transmission system, for being towed behind the ship, the transmission system including first and second transmission links to define a system whereby every control signal transmitted from the ship down only the first link returns unchanged on only the second link;
  (b) a plurality of data acquisition control modules physically spaced along the cable at various distances from the shipboard control electronics, each module being in communication with the shipboard control electronics via the transmission system, each module including:
    (i) a regenerative repeater for receiving and repeating the control signals from the ship to the end of the first transmission link;
    (ii) a transreceiver for decoding the control signal and for telemetering on the second transmission link a plurality of digital seismic data signals in the time gap following the control signal having a unique address corresponding to the module, thereby to define a multi-bit module word;
    (iii) digitizing circuit means coupled to receive a plurality of analog seismic data signals for generating the plurality of digital seismic data signals in accordance with the control signal;
    (iv) the transceiver including a comparator for identifying the unique address in the control signal so that for each control module, a respective control module is responsive to only a control signal which contains the unique address of that respective control module, without regard to the module's physical distance from the shipboard control electronics;
    (v) an oscillator circuit for generating a module clocking signal which synchronizes actions of the regenerative repeater, the transceiver, and the digitizing circuit means to the control signal; and
    (vi) means for synchronizing the oscillator circuit with bit occurrence in the module word; and
  (c) a plurality of seismic sensors secured to the cable for generating the plurality of analog seismic data signals in response to the receipt of the sound waves.

5. The marine seismic system according to claim 4, wherein the means for synchronizing includes means for locking the clocking signal to the control signal during the occurrence of the first bit of the control signal.

6. The marine seismic system according to claim 5, wherein the means for synchronizing further includes means for locking the clocking signal to the control signal substantially at the center of each bit of the control signal.

7. A digital marine seismic system adapted to be towed behind a ship for collecting sound waves representative of seismic signals, for generating digital data signals representative of the seismic signals, and for telemetering the digital data signals to shipboard control electronics, the shipboard control electronics being of the type which generates control signals for controlling the collecting, the generating, and the telemetering of the data, comprising:
   (a) a seismic cable, including a data transmission system, for being towed behind the ship, the transmission system including first and second transmission links to define a system whereby every control signal transmitted from the ship down the first transmission link returns unchanged on the second transmission link;
   (b) a plurality of data acquisition control modules spaced along the cable, physically spaced at various distances from the shipboard control electronics, each module being in communication with the shipboard control electronics via the transmission system, each respective module having a command/address detector for detecting a unique address of that respective module in the control signal, each module including:
      (i) a regenerative repeater for receiving and repeating the control signals from the ship to the end of the first transmission link,
      (ii) a transceiver for decoding the control signal and for telemetering on the second transmission link a plurality of digital seismic data signals in a time gap following the control signal having the unique address of that respective module, thereby to define a multi-bit module word, wherein the multi-bit module word is at least eighty percent digital data signals representative of the seismic signals, and
      (iii) digitizing circuit means coupled to receive a plurality of analog seismic data signals for simultaneously generating the plurality of digital seismic data signals in accordance with the control signal; and,
   (c) a plurality of seismic sensors secured to the cable for generating the plurality of analog seismic data signals in response to the receipt of the sound waves.

8. The marine seismic system according to claim 7, wherein the control module further includes: (a) a crystal-controlled oscillator circuit for generating a module clocking signal which synchronizes actions of the regenerative repeater, the transceiver, and the digitizing circuit means to the control signal; and (b) means for synchronizing the crystal-controlled oscillator circuit with bit occurrence in the module word.

9. The marine seismic system according to claim 8, wherein the means for synchronizing includes means for locking the clocking signal to the control signal during the occurrence of the first bit of the control signal.

10. A digital marine seismic system adapted to be towed behind a ship for collecting sound waves representative of seismic signals, for generating digital data signals representative of the seismic signals, and for telemetering the digital data signals to shipboard control electronics, the shipboard control electronics being of the type which generates control signals for controlling the collecting, the generating, and the telemetering of the data, comprising:
   (a) a seismic cable, including a data transmission system, for being towed behind the ship, the transmission system including first and second transmission links to define a system whereby every control signal transmitted from the ship down the first transmission link returns unchanged on the second transmission link for detection by the shipboard control electronics;
   (b) a plurality of control modules spaced along the cable, physically spaced at various distances from the shipboard control electronics, each module being in communication with the shipboard control electronics via the transmission system, each respective module having a command/address detector, the detector adapted for being programmed with a unique address by a programming signal from the shipboard control electronics while the module is in the water, for detecting the unique address in the control signal, wherein the physical spacing and the distances of each module are independent of the unique address in each control signal, each module including:
      (i) a regenerative repeater for receiving and repeating the control signals form the ship to the end of the first transmission link,
      (ii) a transceiver for decoding the control signal and for telemetering on the second transmission link a plurality of digital seismic data signals in a time gap following the control signal having the unique address of that respective module, thereby to define a multi-bit module word, wherein the multi-bit module word is at least eighty percent digital data signals representative of the seismic signals,
      (iii) digitizing circuit means coupled to receive a plurality of analog seismic data signals for simultaneously generating the plurality of digital seismic data signals in accordance with the control signal; and
   (c) a plurality of seismic sensors secured to the cable for generating the plurality of analog seismic data signals in response to the receipt of the sound waves.

11. The marine seismic system according to claim 10, wherein the control module further includes: (a) a crystal-controlled oscillator circuit for generating a module clocking signal which synchronizes actions of the regenerative repeater, the transceiver, and the digitizing circuit means to the control signal; and (b) means for synchronizing the crystal-controlled oscillator circuit with bit occurrence in the module word.

12. The marine seismic system according to claim 11, wherein the means for synchronizing includes means for locking the clocking signal to the control signal during the occurrence of the first bit of the control signal.

13. A method for collecting soundwaves representative of seismic signals, for generating digital data signals representative of the seismic signals, and for telemetering the digital data signals to shipboard control electronics, the shipboard control electronics being of the type which generates control signals for controlling the collecting, the generating, and the telemetering of the data, the method comprising the steps of:

(a) towing a seismic cable, including a data transmission system and a plurality of data acquisition control modules, behind the ship, the transmission system including first and second transmission links to define a system whereby every control signal transmitted from the ship down only the first link returns unchanged on only the second link, the modules physically spaced along the cable at various distances from the shipboard control electronics, each module being in communication with the shipboard control electronics via the transmission system;

(b) programming a command/address detector in each module with a unique address;

(c) each module receiving and repeating the control signals from the ship end to the other end of the first transmission link; and (d) each module decoding the control signal and telemetering on the second transmission link a plurality of digital seismic data signals in a time gap following the control signal, thereby to define a multi-bit module word, wherein the multi-bit module word is at least slightly percent digital data signals representative of the seismic signals, the step of decoding and telemetering including the steps of:

(i) identifying the unique of the control signal so that the respective control module is responsive to only a control signal which contains the unique address of that respective control module, (ii) in response to the receipt of the soundwaves, generating a plurality of analog seismic data signals, and (iii) in response to the analog seismic data signals, generating the plurality of digital seismic data signals in accordance with the control signal;

wherein for each module a respective module is responsive to only a control signal which contains the address of that respective module, without regard to the module's physical distance from the shipboard control electronics.

14. The method of claim 13 wherein the step of towing includes detecting by the shipboards control electronics every control signal on the second link.

* * * * *

UNITED STATES PATENT AND TRADEMARK OFFICE
CERTIFICATE OF CORRECTION

PATENT NO. : 4,967,400

DATED : Oct. 30, 1990

INVENTOR(S) : Theodore E. Woods, Stafford, Tex.

It is certified that error appears in the above-identified patent and that said Letters Patent is hereby corrected as shown below:

Column 7 line 26, the number 60 is missing after the word data.

Column 20 line 2, the word -slightly- should be replaced with the word -eighty-.

Column 20 line 6, the word -address- should be inserted after the word -unique.

Signed and Sealed this

Twenty-fifth Day of February, 1992

Attest:

HARRY F. MANBECK, JR.

Attesting Officer

Commissioner of Patents and Trademarks